(12) United States Patent
Andersson

(10) Patent No.: US 8,580,179 B2
(45) Date of Patent: Nov. 12, 2013

(54) APPARATUS FOR MOULDING A PART OF A PACKAGING CONTAINER

(75) Inventor: Pär Andersson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 687 days.

(21) Appl. No.: 12/744,631

(22) PCT Filed: Nov. 26, 2008

(86) PCT No.: PCT/SE2008/000656
§ 371 (c)(1),
(2), (4) Date: May 25, 2010

(87) PCT Pub. No.: WO2009/078778
PCT Pub. Date: Jun. 25, 2009

(65) Prior Publication Data
US 2010/0244317 A1    Sep. 30, 2010

(30) Foreign Application Priority Data
Dec. 18, 2008 (SE) ...................... 0702823

(51) Int. Cl.
*B29C 45/18* (2006.01)
(52) U.S. Cl.
USPC ............. 264/297.2; 264/328.7; 264/328.12; 425/567; 425/573; 425/588; 425/589
(58) Field of Classification Search
USPC ......................... 425/567, 573, 589
See application file for complete search history.

(56) References Cited

U.S. PATENT DOCUMENTS

| 4,021,524 A | 5/1977 | Grimsley |
| 4,518,554 A | 5/1985 | Hatakeyama et al. |
| 5,667,745 A | 9/1997 | Andersson |
| 5,744,088 A | 4/1998 | De Cuyper |
| 6,989,124 B2 | 1/2006 | Miller et al. |

FOREIGN PATENT DOCUMENTS

| FR | 2 320 870 A1 | 3/1977 |
| FR | 2 532 882 A1 | 3/1984 |
| RU | 2127190 C1 | 3/1999 |
| RU | 2310563 C2 | 11/2007 |

OTHER PUBLICATIONS

International Search Report (PCT/ISA/210) issued on Jan. 28, 2009 by Swedish Patent Office as the Searching Authority for International Application No. PCT/SE2008/000656.

*Primary Examiner* — Ryan Ochylski
(74) *Attorney, Agent, or Firm* — Buchanan Ingersoll & Rooney PC

(57) ABSTRACT

An apparatus for molding a thermoplastic package part(s) to an end portion of a container body includes inner and outer mold elements between which a mold cavity per package part is formed. At least one of these mold elements is at least partly freely suspended. When one package part is molded with the mold elements, plastic melt is injected in a first number ≥1 of points in the cavity, an island of plastic melt for each point is formed inside the cavity, and the distribution of the points causes a force center to pass through a surface defined by a parallel projection of each first number of islands on a plane orthogonal to a direction of the compression force, and when the first number >1, a second number of imaginary straight lines interconnecting a third number of parallel projections such that the surface is at its maximum.

11 Claims, 11 Drawing Sheets

Figure 1:
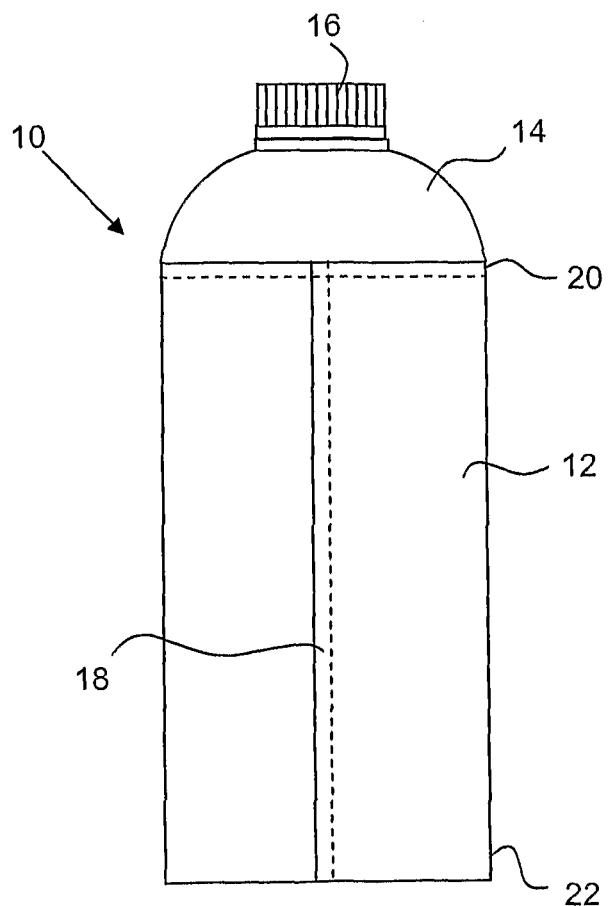

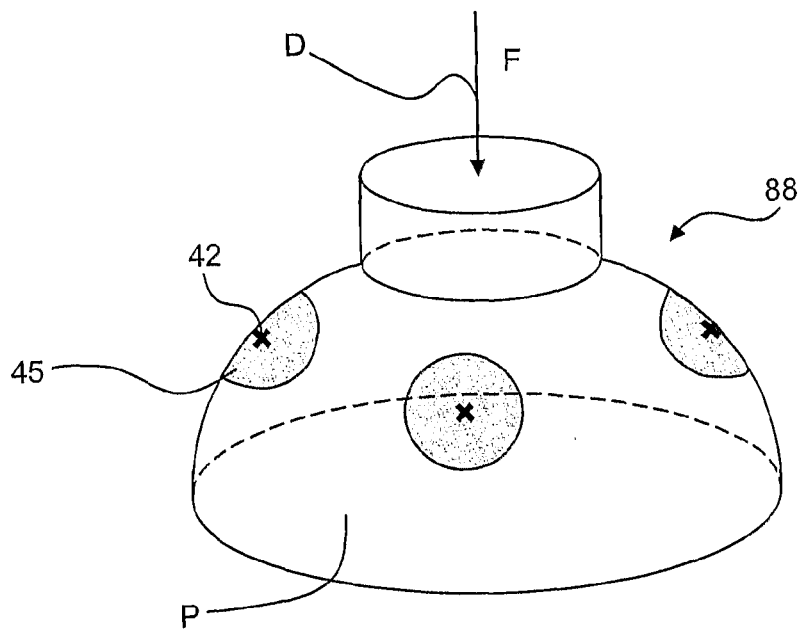
Fig. 6
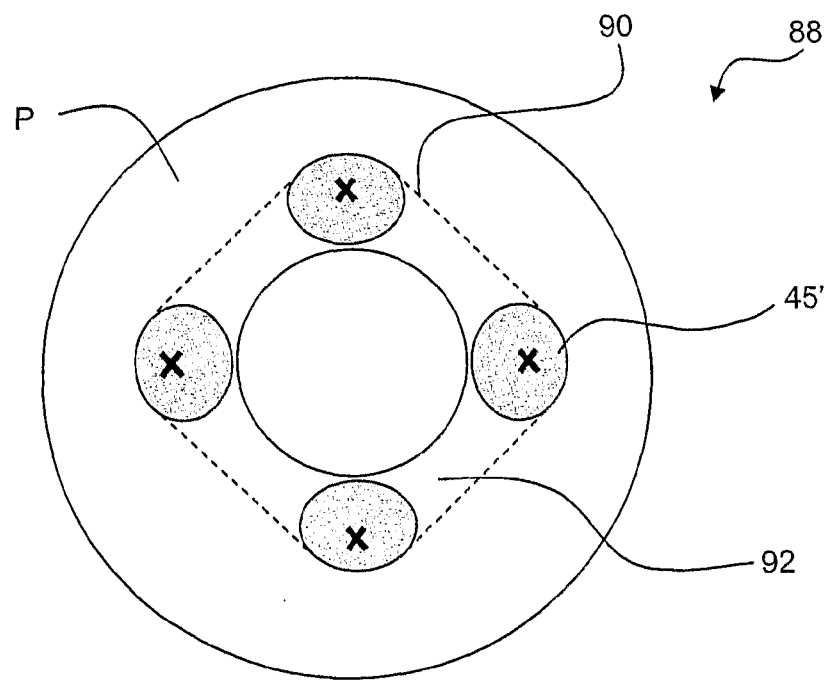

APPARATUS FOR MOULDING A PART OF A PACKAGING CONTAINER

TECHNICAL FIELD

The present invention relates to an apparatus for moulding a part of a packaging container, in particular for moulding a top of thermoplastic on the edge of a sleeve of paper laminate.

BACKGROUND ART

The present invention has been developed to be employed in the moulding of thermoplastic package parts directly on other package parts, such as for example the moulding of a thermoplastic package top on a sleeve of packaging laminate including a core layer of paper. The package top may, in addition to being moulded against the sleeve, also be moulded against an opening device in the form of a cap, for example a screw cap.

The result will be a packaging container in which food may be packed. The Applicant markets similar types of packages under, for example, the registered trademark Tetra Top®.

Such a packaging container is manufactured today in that a flat-laid, tube shaped blank of a packaging laminate is raised and sealed in its one end in that a top of thermoplastic is injection moulded direct on the end portion. The top includes a pouring opening which is defined by a neck with outer threads for engagement with inner threads of a screw cap for sealing the pouring opening. The cap may be applied in two ways. As was mentioned by way of introduction, it may be placed in the moulding tools so that the top, in addition to being moulded against the sleeve, is also moulded against the cap. In such instance, the cap is part of the moulding tools. Alternatively, the cap may be applied once the packaging container is ready formed, i.e. no moulding with the cap as part of the moulding tools takes place. Possibly, in order to facilitate handling in the packing and filling machine, the pouring opening of the neck may, in the latter case, be formed with a tear-off membrane which is moulded simultaneously with the top.

The moulding technology which is currently employed in this context is that which is known as injection compression. In injection compression, a partly closed injection moulding cavity is partly filled with molten thermoplastic material, in a first step. The cavity is then closed completely which gives a compression force on the melt inside, the melt then coming to fill out the cavity. This technology is described in the Applicant's own patent publication U.S. Pat. No. 5,667,745.

The package parts which are injection moulded are of thin-walled material and the production cycle time for this type of injection moulding which takes place in a packing and filling machine is extremely short compared with normal injection moulding. Typically, the production cycle time for the manufacture of one top should not be longer than 1 second. This is necessary in order to be able to maintain machine output capacity at a high level.

From the injection moulding, the package is conveyed with its open end directed upwards and is filled in a subsequent filling station. In some cases, the package also passes one or more sterilization stations before filling. After filling, the open end of the package is folded and sealed.

One alternative to injection compression is compression moulding. In this operation, an adapted quantity of molten thermoplastic material is injected into a cavity in open moulding tools, whereafter the moulding tools are compressed together so that the melt will fill out the cavity.

In order to obtain a good result in both of these types of moulding of thin-walled package parts, it is of crucial importance that the plastic melt is rapidly distributed uniformly in the cavity when the pressure is applied. This becomes particularly important in those cases where the configuration of the package parts is complicated and in those cases where the intention is to manufacture more than one package part at the same time in the same moulding tool.

In conventional injection moulding and compression moulding, use is made of stable suspension of the moulding tools and symmetry is required in the moulding apparatus to obtain a good quality of those objects which are moulded. For example, it is necessary that the moulding tools be placed in a symmetric pattern (in, those cases where the intention is to have more than one cavity) so that the injection ducts on injection moulding will be of equal length, that the same quantity of melt is injected in those points at which the melt is fed into the cavity or cavities and that the points are uniformly distributed. However, despite the symmetry it may be difficult to attain balance in the moulding apparatus, i.e. to cause the flow front of the plastic melt to move uniformly everywhere before the plastic melt has time to harden anywhere. External disruptions may easily give rise to instability. Such disruptions may, for example, be uneven control of the moulding tools or changes in the quantity of plastic melt at any point or in the composition of the plastic melt proper.

One way of realising greater stability and greater immunity to disruption is to use moulding tools which have a certain mutual movability in relation to one another also once the compression has commenced. This means that at least the one moulding tool is suspended more or less "buoyant" and can compensate for certain disruptions so that stability and power balance within the moulding apparatus can nevertheless be attained.

It has however proved that this solution per se is insufficient to achieve optimum moulding, but there is room for improvement as regards balancing of the mould.

SUMMARY OF THE INVENTION

One object of the present invention is therefore to propose an apparatus for moulding a thermoplastic package part in association with an end portion of a packaging container body, which package part can be produced with a high degree of accuracy thanks to improved stability in the moulding apparatus.

The above object will be attained by means of an apparatus which comprises an inner mould element and an outer mould element between which a moulding cavity is formed, the cavity being disposed to be able to receive at least said end portion of the packaging container body so that it is in contact with the cavity, and of which at least one of said mould elements is at least partly freely suspended, means for injecting in a plastic melt into the cavity, means for converging said mould elements so that the cavity is closed and for applying a compression force on the mould elements in order to press out the plastic melt in the cavity, the compression force, as a result of the partly free suspension of at least one of the mould elements, acting in a force centre. The apparatus is characterised in that the plastic melt is injected in at a first number ≥1 of points in the cavity, an island of plastic melt for each point being formed inside the cavity, and that the distribution of said points is such that said force centre may be caused to pass through a surface which is defined by a parallel projection of each one of said first number of islands on a plane which is orthogonal to a direction of the compression force, and, when said first number >1, a second number of imaginary straight lines which interconnect a third number of the parallel projections in such a manner that the surface will be at its maximum.

The partly free suspension of at least one of the mould elements implies a possibility for the apparatus to realise greater stability and greater immunity to disruptions. If melt is injected into the cavity in a number of points, and slightly more melt enters at one point than the other points, the apparatus can compensate for this if said force centre may be caused to pass through a surface which is defined in the above mentioned manner, the surface being contiguous and continuous. When the mould elements are then compressed together, there will initially be a greater pressure in the larger quantity of melt and the movable mould element adjusts itself accordingly. However, the cavity strives to create a power balance and the compression force entails that the greater quantity of melt is spread out over a larger area than the smaller quantities of melt. As a result, the difference in pressure in the different melts is ultimately substantially zero, and the movable mould element adjusts itself accordingly. The material thickness of the moulded thermoplastic package part will thereby be more or less uniform.

The number of points for the injection of plastic melt in the cavity may thus be one and upwards. In the case with one injection point (said first number=1), that surface through which the force centre is to pass is defined by a parallel projection of a single island of plastic melt on the plane of projection. In this case, according to the present invention, the force centre should thus pass through this projection.

In the case with two injection points (said first number=2), the surface through which the force centre is to pass is defined by two parallel projections on the plane of projection, one for each island of plastic melt, and two imaginary straight lines (said second number=said first number=2) which interconnect the two parallel projections (said third number=said second number=2) in such a manner that the surface will be at its maximum. In this case, according to the present invention, the force centre should thus pass through one of the parallel projections or the area therebetween which is defined by the imaginary lines.

In the case with more than two injection points, the situation is slightly more complicated. If the number of injection points is, for example, three (said first number=3), the surface through which the force centre is to pass is defined by three parallel projections on the plane of projection, one for each island of plastic melt, and a second number of imaginary straight lines which interconnect a third number of the projections in such a manner that the surface will be at its maximum. The second and third number are thus to be selected in such a manner that the surface which is thereby defined will be at its maximum. How this selection is made depends at least on the positioning of the injection points in relation to one another and the sizes of the corresponding islands of plastic melt. The size of an island depends at least upon the quantity of plastic melt which is injected into the corresponding injection point as well as the appearance of the cavity in the area of the injection point. Further, the second number of imaginary lines is to be drawn between the third number of parallel projections in such a manner that the surface which is thereby defined will be at its maximum.

The awareness of the importance of the relationship between the application point for the compression force, the at least partly free suspension of at least one of the mould elements, the positioning of the points for injection of the plastic melt as well as the island size is crucially important in order for it to be possible to realise an apparatus with which it is possible with very short production cycle time to mould thin-walled package parts with great accuracy and nevertheless be tolerant as regards for example the guiding of the mould elements and the distribution of plastic melt to each respective point. Stability and power balance in the cavity can nevertheless be attained.

In one currently preferred embodiment, the apparatus according to the present invention includes means for converging the mould elements so that the cavity is partly closed before the plastic melt is injected, and the plastic melt is injected into the cavity through ducts, each of which ducts being in its one end in communication with an extruder and in its other end discharges in the cavity in one of said points. This technology is entitled, as was mentioned previously, injection compression and gives a very good result on moulding of above all thin-walled package tops.

In yet a further currently preferred embodiment, a partial quantity of the plastic melt is injected into each of said points in a position where the cavity is substantially open. This technology is entitled, as was previously mentioned, compression moulding and also functions well in the moulding of package tops.

The present invention also includes an apparatus for moulding two or more thermoplastic package parts in association each to an end portion of a packaging container body. The apparatus comprises an inner mould element and an outer mould element between which one injection mould cavity per package part is formed, the cavity being disposed to be able to receive at least said end portion of the packaging container body so that it is in contact with the cavity, and of which at least one of said mould elements is at least partly freely suspended, means for injecting a plastic melt in the cavities, means for converging said mould elements so that the cavities are closed and for applying a compression force on the mould elements in order to press out the plastic melt in the cavities, the compression force, as a result of the partly free suspension of at least one of the mould elements, acting in a force centre. The apparatus is characterised in that the plastic melt is injected in at a first number of points distributed over the cavities so that, for each one of the cavities, there is at least one point, an island of plastic melt for each point being formed inside the cavities, and that the distribution of said points is such that said force centre may be caused to pass through a surface which is defined by a parallel projection of each one of said first number of islands on a plane which is orthogonal to a direction of the compression force, and a second number of imaginary straight lines which interconnect a third number of the parallel projections in such a manner that the surface will be at its maximum.

In order to attain stability and force balance, in principle the same criteria thus apply as in the moulding of but a single package part.

In one currently preferred embodiment of the present invention, the package part is moulded on a packaging container body in the form of a sleeve of packaging laminate including a core layer of paper.

Yet a further currently preferred embodiment is characterised in that the cavity, in its closed position, is in the form of a package top including a pouring opening.

In still a further currently preferred embodiment of the present invention, the cavity is disposed also to be able to receive an opening device in the form of a cap, the cap together with a part of the inner mould element being disposed to form a neck of said package top which defines said pouring opening. By positioning a cap, for example a screw cap, in the cavity it is possible for the packaging top to be moulded against the cap, which gives an opening device which is extremely simple to handle for the consumer, but which, before opening, is nevertheless extremely tight and leakproof.

One currently preferred embodiment of the present invention is characterised in that the at least partly free suspension implies that at least one of the mould elements is suspended via a resilient element, and that the compression force can thereby be restricted somewhat. By such means, the apparatus is capable of balancing out any possible oblique guiding of the mould elements as well as possible distorted distribution of the plastic melt over each respective injection point.

In yet a further currently preferred embodiment of the present invention, that one of the mould elements which is at least partly freely suspended is substantially statically suspended. That mould element will then be completely freely adjustable.

The present invention also relates to a method for moulding a thermoplastic package part in association with an end portion of a packaging container body, the packaging container body including thermoplastic at least in an inner layer. The method comprises the steps of providing an inner mould element and an outer mould element between which a mould cavity is formed, ensuring that at least one of said mould elements is at least partly freely, suspended, disposing said end portion of the packaging container body so that it is in contact with the cavity, injecting a plastic melt into the cavity, converging said mould elements so that the cavity is closed, applying a compression force on the mould elements to press out the plastic melt in the cavity, the compression force, as a result of the partly free suspension of at least one of the mould elements, acting in a force centre. The method is characterised by the steps of injecting the plastic melt in a first number ≥1 of points in the cavity in order to form inside the cavity an island of plastic melt for each point, and ensuring that the distribution of said points is such that said force centre may be caused to pass through a surface which is defined by a parallel projection of each one of said first number of islands on a plane which is orthogonal to a direction of the compression force and, when said first number >1, a second number of imaginary straight lines which interconnect a third number of the parallel projections in such a manner that the surface will be at its maximum. Those advantages which were presented above in connection with the apparatus also apply to the method according to the invention.

The present invention also relates to a method for moulding of two or more thermoplastic package parts in association each to one end portion of a packaging container body, the packaging container body including thermoplastic at least in an inner layer. The method comprises the steps of providing an inner mould element and an outer mould element between which one mould cavity per package part is formed, ensuring that at least one of said mould elements is at least partly freely suspended, disposing said end portion of the packaging container body so that it is in contact with the cavity, injecting a plastic melt in the cavities, converging said mould elements so that the cavities are closed, applying a compression force on the mould elements to press out the plastic melt in the cavities, the compression force, as a result of the partly free suspension of at least one of the mould elements, acting in a force centre. The method is characterised by the steps of injecting the plastic melt in a first number of points distributed over the cavities so that, for each one of the cavities there is at least one point, in order to form inside the cavities an island of plastic melt for each point, and ensuring that the distribution of said points is such that said force centre may be caused to pass through a surface which is defined by a parallel projection of each one of said first number of islands on a plane which is orthogonal to a direction of the compression force and a second number of imaginary straight lines which interconnect a third number of the parallel projections in such a manner that the surface will be at its maximum.

BRIEF DESCRIPTION OF THE ACCOMPANYING DRAWINGS

Figure 2:
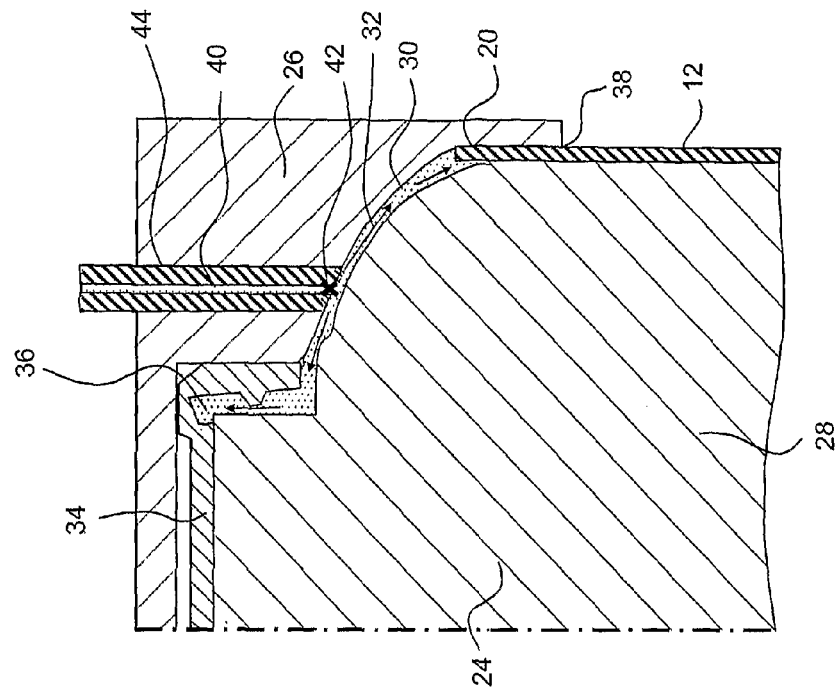
Figure 3:
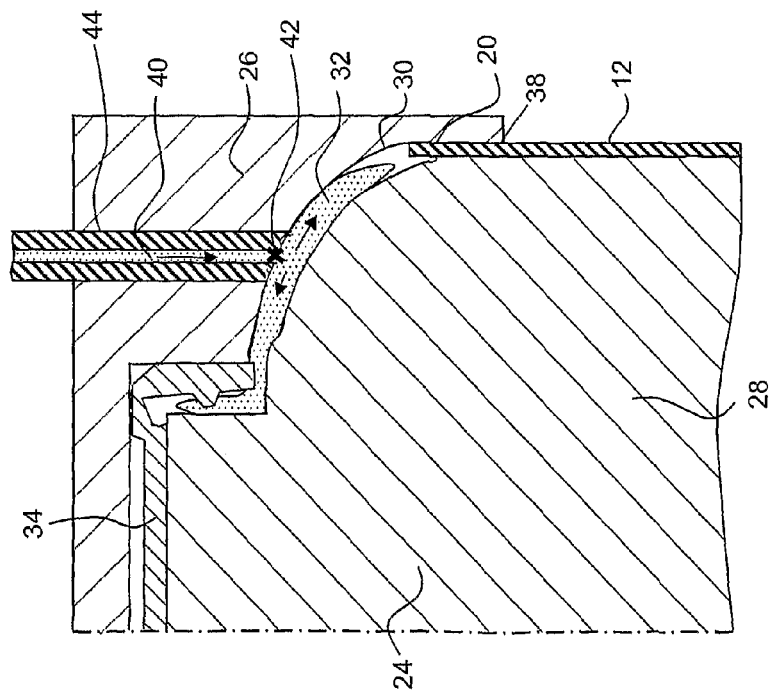
Figure 5A:
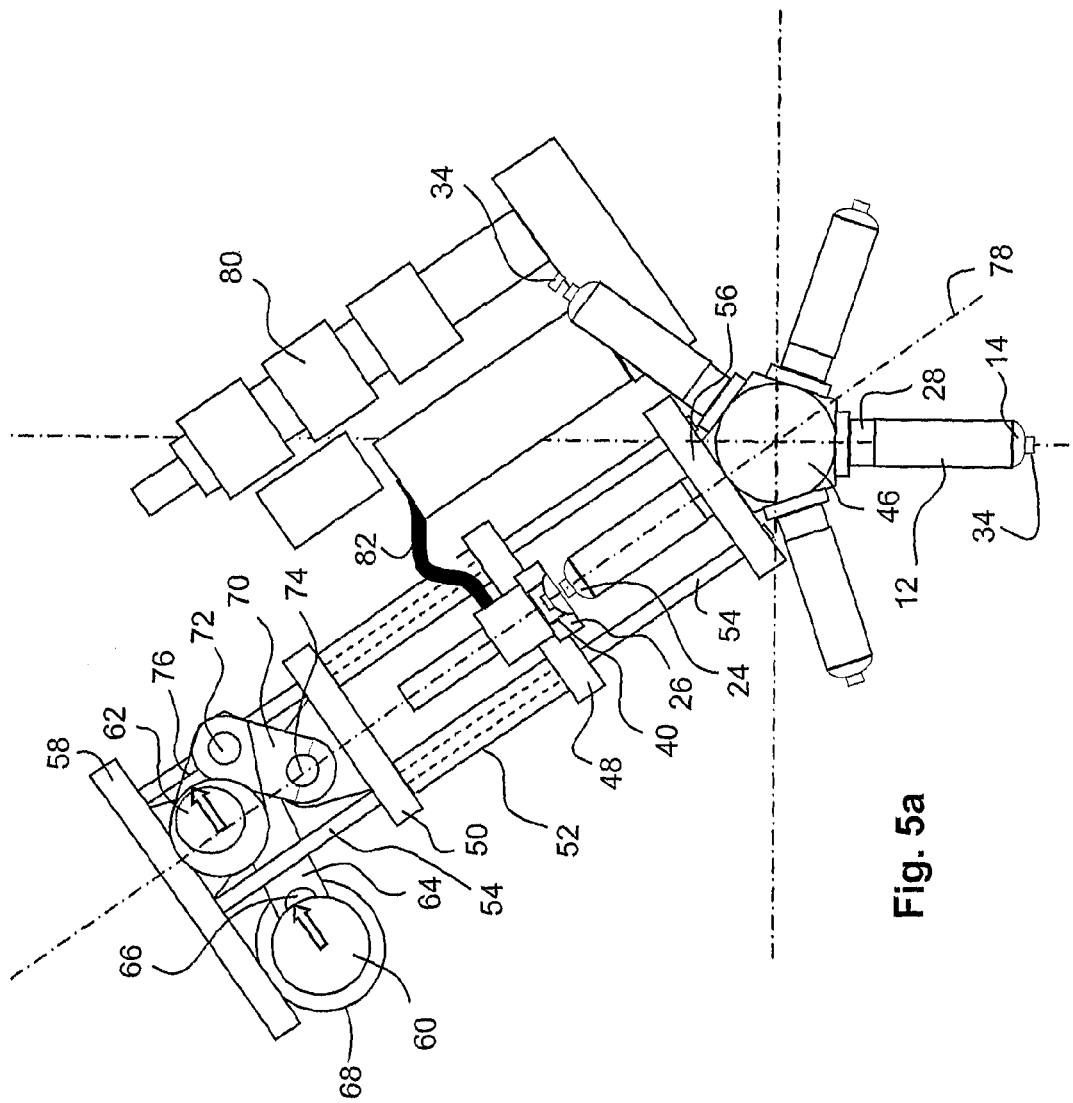
Figure 5B:
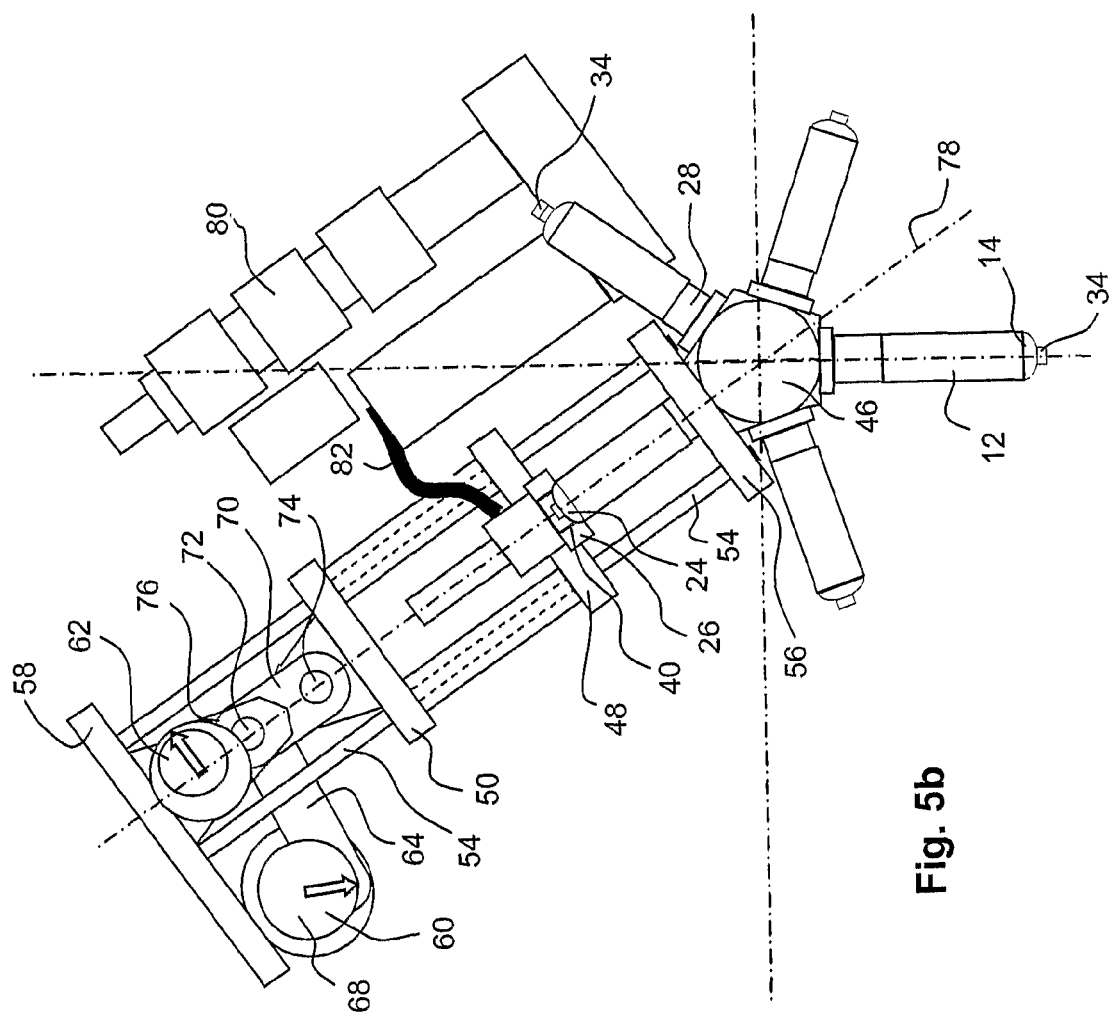
Figure 5C:
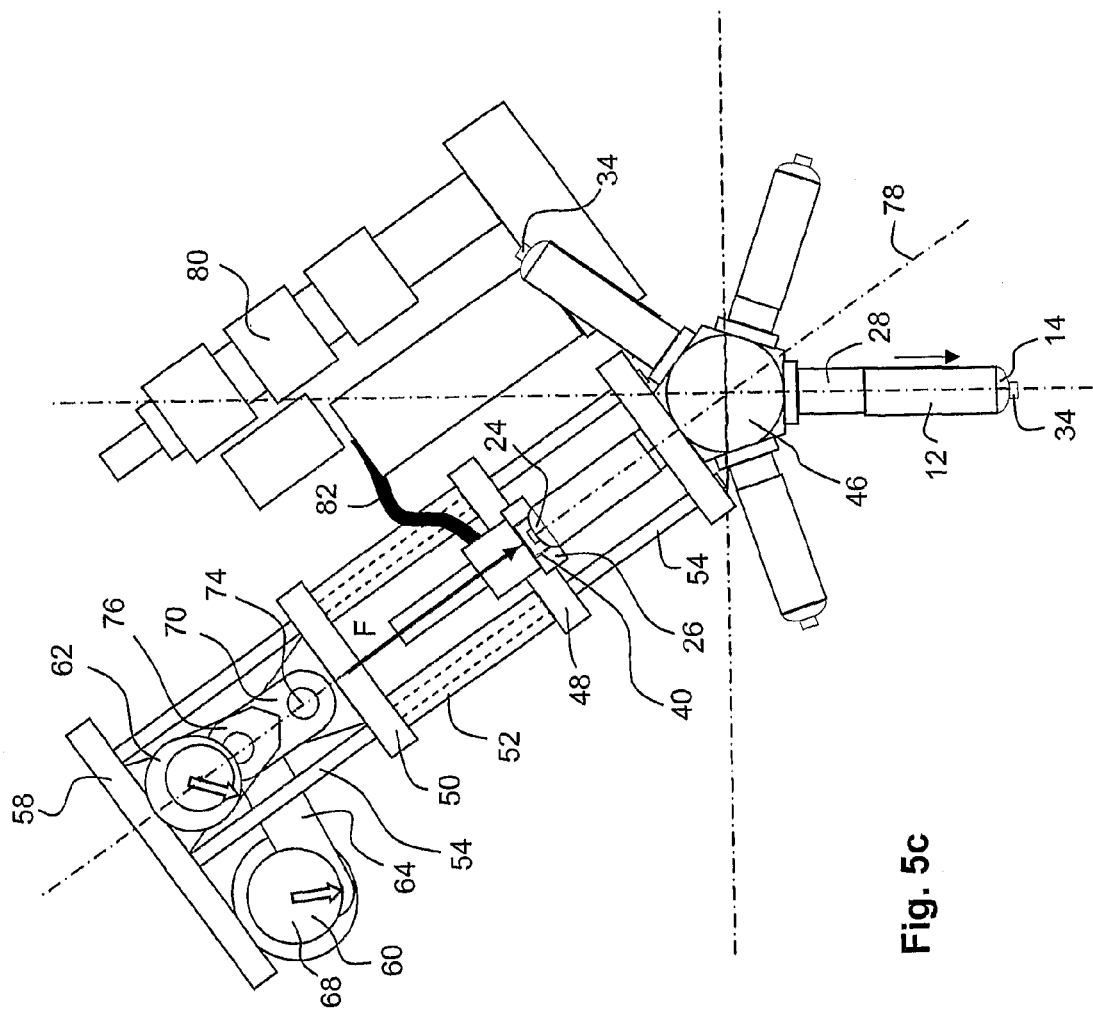
Figure 7:
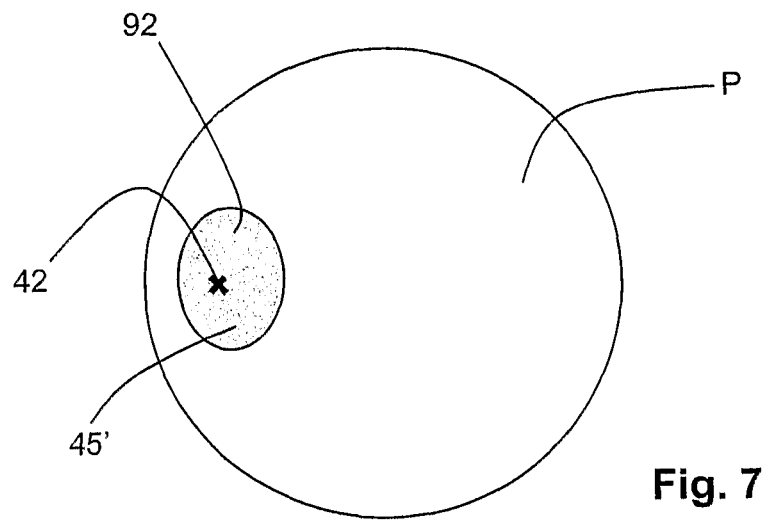
Figure 8:
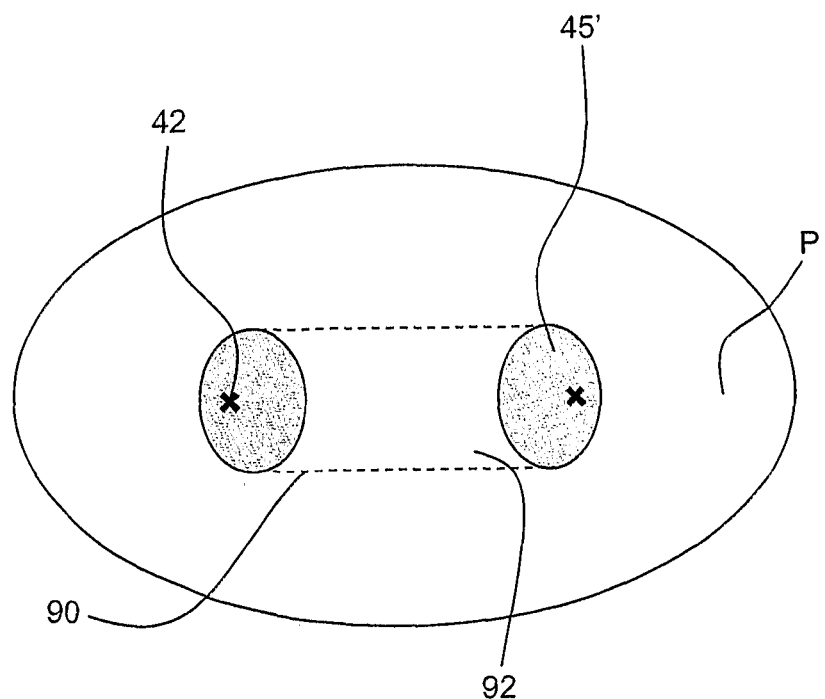
Figure 9:
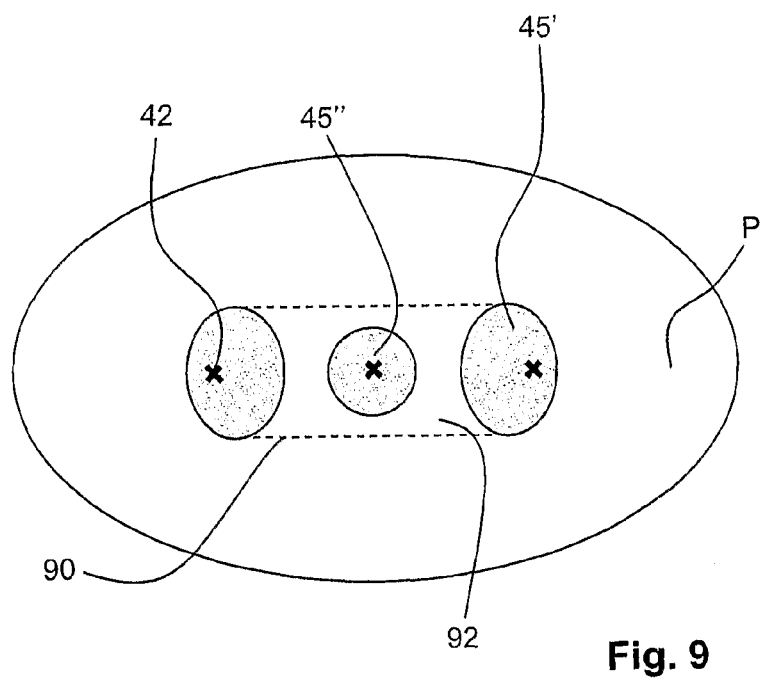
Figure 10:
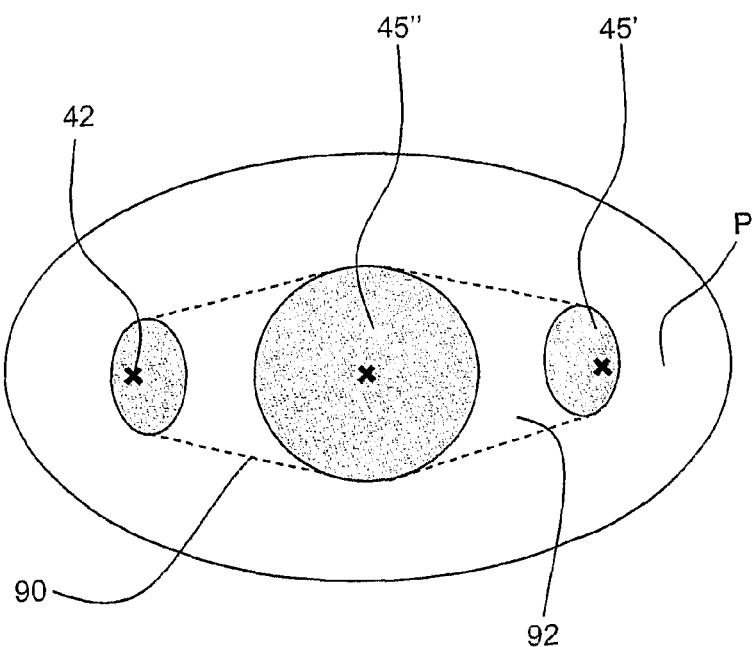
Figure 11:
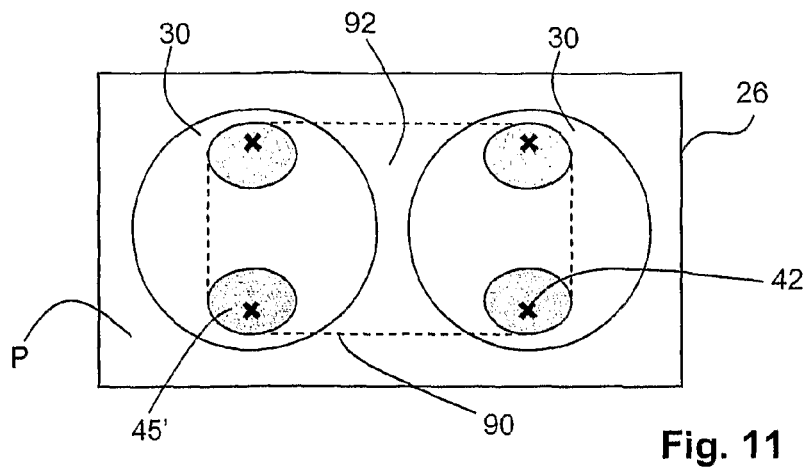
Figure 12:
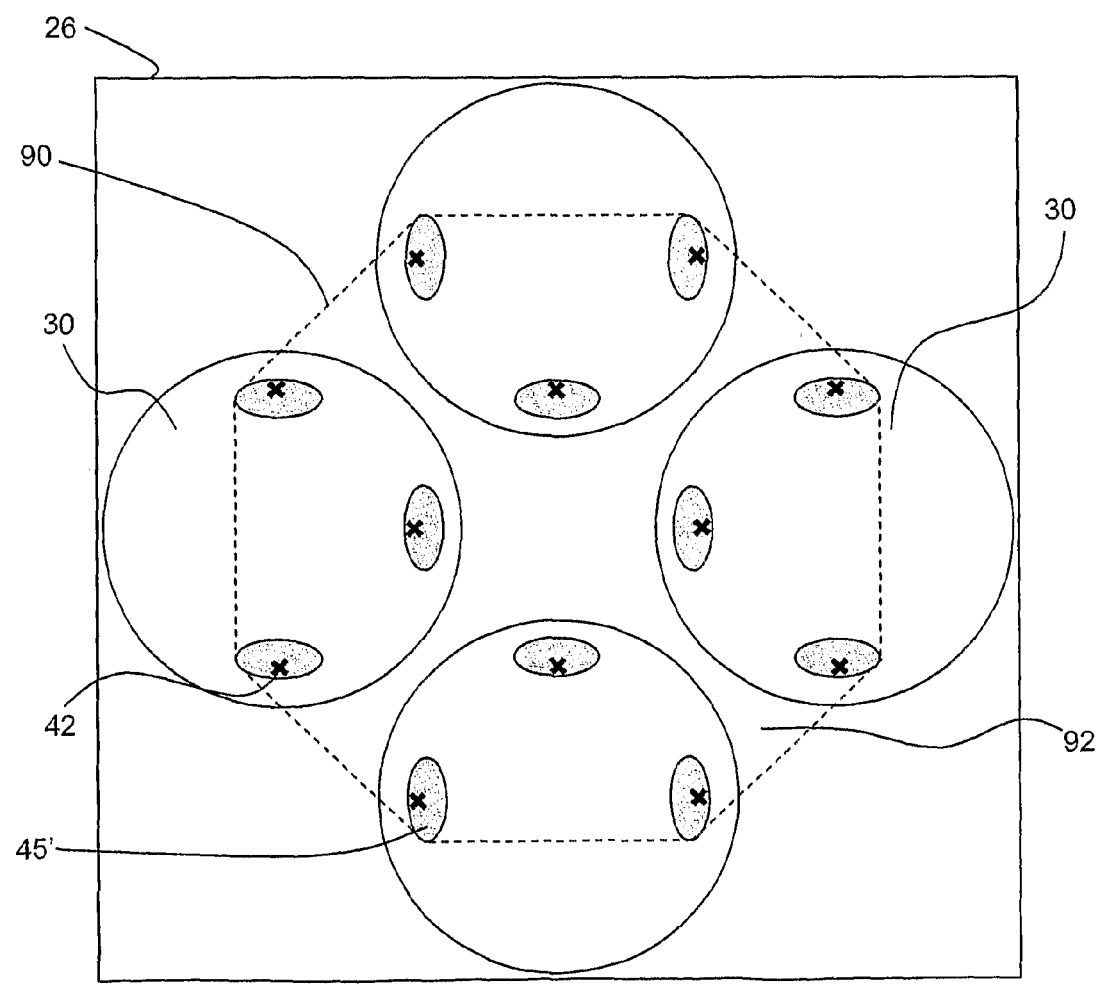

The present invention will now be described in greater detail hereinbelow, with the aid of currently preferred embodiments which are shown in the accompanying schematic drawings, in which:

FIG. 1 schematically shows a packaging container in connection with which the present invention may be employed;

FIG. 2 schematically shows a view in cross section for illustrating a position where a material melt is injected into a cavity between an inner and an outer mould element which are located in an almost closed position;

FIG. 3 schematically shows a view according to FIG. 2 but where both of the mould elements have been compressed together to a closed position and the material melt therefore has flowed out in the whole of the cavity;

FIG. 4a-4d schematically illustrate a lower view of the cavity from above and the injected plastic melt and an upper view showing a section through the line A-A in the lower view;

FIG. 5a-5c schematically show sectional views of the mould elements which are employed in one example of an injection moulding apparatus, and the different figures illustrate different steps in a work cycle;

FIG. 6 schematically shows, in an upper perspective view, a body representing a cavity and, in a lower top plan view, a force application surface which is created on the basis of four injection points;

FIG. 7 corresponds to the lower part of FIG. 6 and schematically shows a force application surface which is created on the basis of one injection point;

FIG. 8 corresponds to the lower part of FIG. 6 and schematically shows a force application surface which is created on the basis of two injection points;

FIGS. 9-10 correspond to the lower part of FIG. 6 and schematically each show a force application surface which is created on the basis of three injection points;

FIG. 11 schematically shows a force application surface which is created on the basis of two cavities and four injection points; and FIG. 12 schematically shows a force application surface which is created on the basis of four cavities and twelve injection points.

It should be observed that the same reference numerals have been employed for purposes of simplicity to designate the same or similar objects in the examples illustrated in the figures.

DETAILED DESCRIPTION OF EMBODIMENTS

The present invention is applicable in the manufacture of, for example, such a packaging container as is illustrated in FIG. 1, and which hereinbelow will be given reference numeral 10. Said packaging container 10 comprises a body 12 in the form of a sleeve of packaging laminate and a thermoplastic package part in the form of a thin-walled top 14. On the top 14 a neck with a pouring opening is arranged (not shown), and this pouring opening is provided with an opening device 16 in the form of a cap which, in this example, consists of a screw cap with threads on the inside which engage with threads on the outside of the neck.

The sleeve 12 is manufactured in that two longitudinal edges of a sheet of packaging laminate are caused to form an overlap joint 18 which is sealed. The packaging laminate may be of a multiplicity of types, but normally comprises a core layer of paper or paperboard and one or more barrier layers of, for example, plastic and aluminium foil. In this example, the laminate comprises an outer layer of thermoplastic at least on that side of the laminate which is turned to face inwards towards the centre of the packaging container. The material is preferably polyethylene (PE) or polypropylene (PP), but other thermoplastics or combinations thereof are naturally possible.

Initially, the sleeve 12 is open in both of its axial ends. Direct on one end portion 20 of one of the ends, the top 14 is injection moulded using the apparatus and the method according to the present invention.

During the injection moulding, the other end 22 of the sleeve 12 is open. This is sealed and finally folded only after sterilization and product filling of the packaging container 10.

The top 14 includes at least one material in the form of a base material, and possibly also a barrier material (which will not be described here). The base material is preferably a thermoplastic. Examples of suitable thermoplastics are polypropylene (PP) and polyethylene (PE).

The moulding of the top 14 may, as was described by way of introduction, suitably be put into effect principally in two ways, either by injection compression or by compression moulding.

The present invention will be described hereinbelow with an apparatus and a method for injection compression. FIG. 2 shows parts of an inner and an outer mould element in the form of moulding tools 24, 26. The inner tool 24 may, for example, be an end of an arm 28 on a mandrel wheel in a packing and filling machine, while the outer tool 26 is disposed to be able to be pressed down towards and surround the inner tool 24 and a distance of the arm 28.

Further, the apparatus includes means, which will be described later, for converging said inner and outer tools 24, 26. When they converge, there is formed a moulding cavity 30 between them, in which the previously described top 14 is to be moulded. The tools 24, 26 have three major positions. A first, open position, which is not shown, in which the outer tool 26 is not disposed to surround the inner tool 24, but where a sleeve 12 of packaging laminate may be passed onto the arm 28. This sleeve 12 may, after the injection moulding has been carried out, be removed from the arm 28. The sleeve 12 is disposed on the inner tool 24 such that its end portion 20 will be in the cavity 30 when the tools 24, 26 converge. FIG. 2 shows the second position, which is an almost closed position. The outer tool 26 surrounds the inner tool 24, but the cavity 30 between the outer and inner tools 24, 26 has a first volume which is larger than the volume of the top 14 to be injection moulded. In this position, a plastic melt 32 is injected into the cavity 30, but the volume of the melt 32 is not as large as the volume of the cavity 30 in this position. FIG. 3 shows the third position. There, the outer tool 26 is urged down towards the inner tool 24 until the melt 32 which has been injected is forced out in the cavity 30 and comes into contact with the end portion 20 of the sleeve 12. On the compression, the cavity 30 assumes a second, smaller volume, this volume substantially corresponding to the volume of the thin-walled top 14.

The outer and inner tools 24, 26 are designed so that, in the third position, they do not bottom out in one another. Instead, the outer tool 26 can, if necessary, be urged further against the inner tool 24. This is employed during the setting and cooling process before the tools are opened. Even though the top shrinks when it cools, the outer tool 26 can continue to urge against it, and as a result of the continued contact with the outer tool 26, a more efficient cooling cycle will be obtained.

As shown in FIGS. 2 and 3, the top is injected moulded, in this case, not only against the end portion 20 of the sleeve, but also against a cap 34. The cap 34 together with the inner tool 24 forms a region in an end portion of the cavity which is disposed to form a neck 36 of the top 14. The neck 36 constitutes the edge of the previously mentioned pouring opening. In the example, the pouring opening is formed in that end of the top 14 which is disposed most distal from the sleeve 12. The cap 34 is thus placed on the outer end of the inner tool 24. It can be seen, for example, in FIG. 2 that the inner tool 24, at the neck 36, has a smaller diameter than the inner diameter of the cap 34, and that the neck 36 will be formed between the inner tool 24 and the inner circumferential surface of the cap. The outer tool 26 will abut against the outer circumferential surface of the cap 34 as well as partially against the upper circular surface of the cap. The cap 34 is manufactured by injection moulding, but arrives in the finished state at the packing and filling machine. The material in the cap is preferably polyethylene (PE) or polypropylene (PP). Other thermoplastics or combinations thereof are naturally possible.

In order for the end portion 20 of the sleeve 12 to be able to be disposed in the cavity 30 between the outer and the inner tool 24, 26, there is an opening 38 through which the end portion 20 may extend. In the open position, the sleeve 12 is disposed on the arm 28 in such a manner that the end portion 20 will extend in over the inner moulding tool 24 in the end of the arm 28. When the outer tool 26 thus surrounds the inner tool 24 and a distance of the arm 28, the sleeve 12 is locked in position and its end portion 20 is placed inside the cavity 30.

The plastic melt 32 is prepared and injected into the cavity 30 by suitable means, for example comprising a conventional injection moulding extruder (not shown) as well as with it connected supply ducts 40 which discharge in points in the cavity 30. The points are marked by a cross. FIGS. 2 and 3 show one such supply duct 40 which runs through the outer tool 26 and discharges in a point 42 in the cavity 30.

Surrounding the supply duct 40, there is a heating element 44, preferably electric, which ensures that the melt 32 in the duct 40 does not cool and harden, but maintains its molten state.

The inner and outer tools 24, 26 are provided with a number of cooling ducts (not shown) for cooling the tool and thereby the injection moulded package part. Cooling water is led in the ducts, and in the described example, the cooling ducts ensure that the temperature of the tools is kept roughly at room temperature, i.e. approx. 20° C.

Figure 4B:
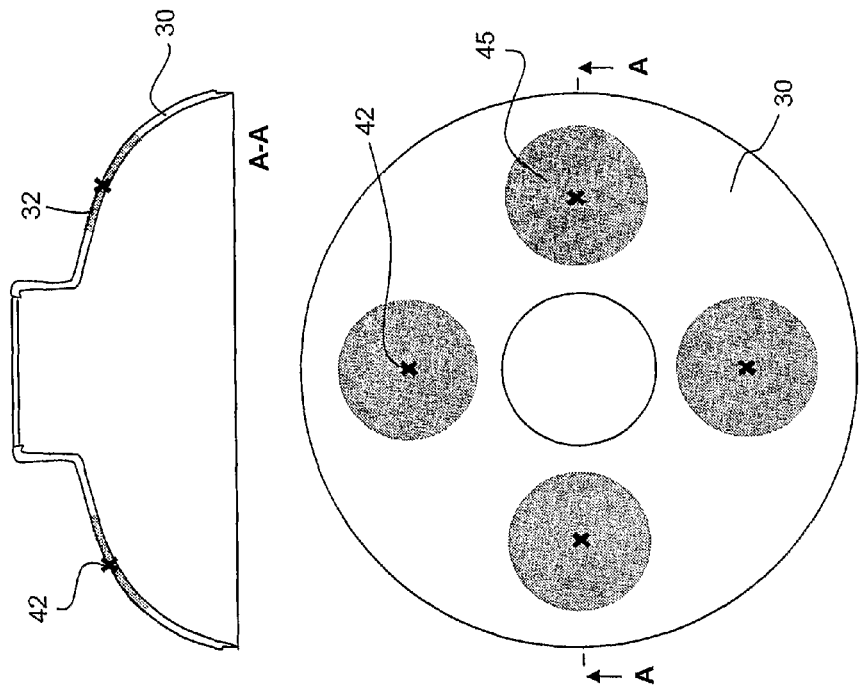
Figure 4A:
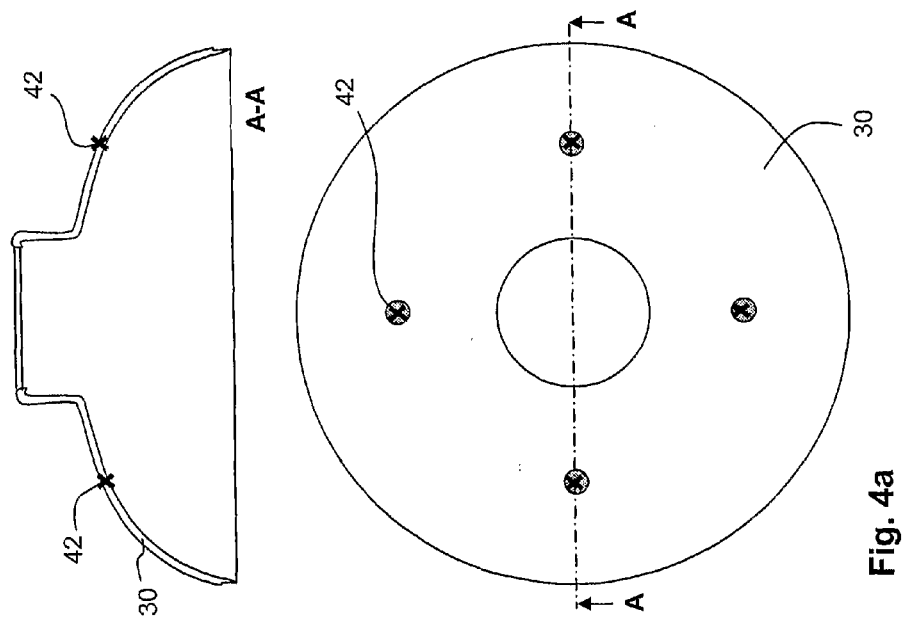
Figure 4D:
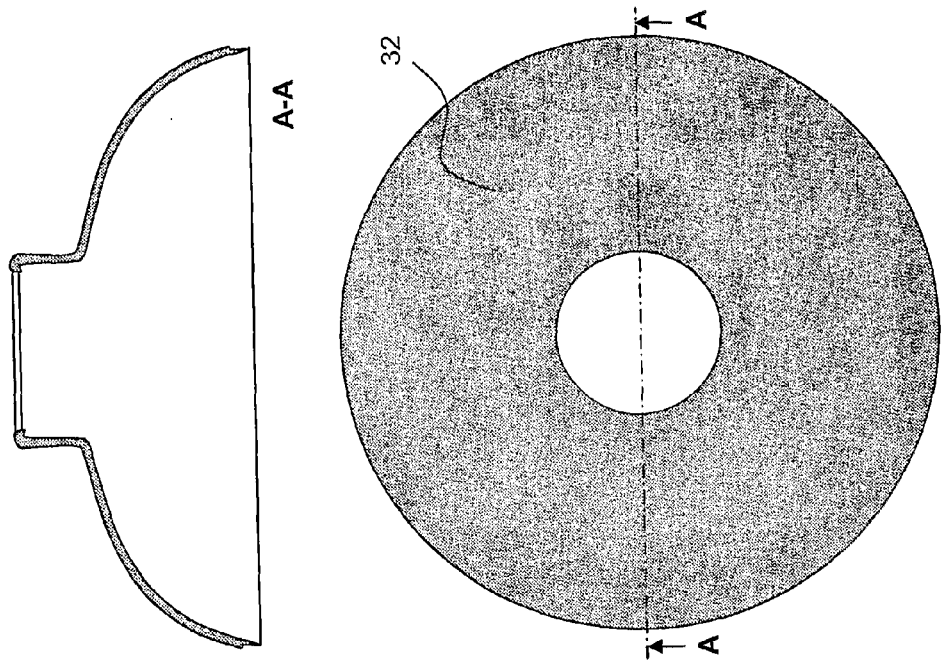
Figure 4C:
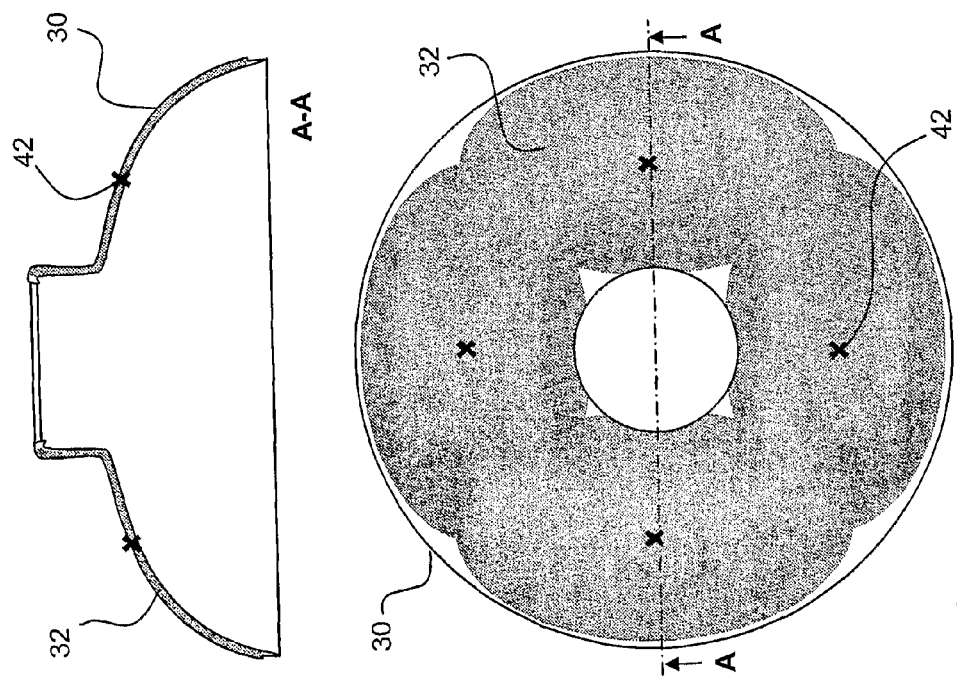

In FIGS. 2 and 3 is shown but a single supply duct 40. However, in this example there are a total of four supply ducts uniformly distributed in the cavity 30. Thus, the plastic melt is injected simultaneously in four points into the cavity for the formation of four "cake pieces" of the top. This is illustrated highly schematically in FIGS. 4a-4d. In these figures, only the cavity 30 is shown, by a contour, and the injection points 42 (once again in the form of crosses). The plastic melt 32 is shown as grey "spots". In FIG. 4a, the injection operation is just about to commence. In FIG. 4b, the quantity of plastic melt 32 which is necessary to form the top has been injected into the cavity 30 and an island 45 of plastic melt for each injection point 42 has been formed therein. In FIG. 4c, the compression of the moulding tools 24 and 26 has commenced. FIG. 4d illustrates the third position where the moulding tools 24, 26 have been compressed together and the plastic melt 32 has thereby been forced out in the cavity 30.

The apparatus according to the invention also includes means for converging the inner and outer moulding tools 24, 26 so that the cavity 30 is closed and for applying a compression force on the tools 24, 26 to force out the plastic melt 32 in the cavity 30. These means, which hereinbelow will be described with an example, also fulfil the purpose of realising a partly free suspension of at least one of the moulding tools 24, 26.

FIG. 5a shows the inner and outer tools 24, 26, as well as the means for converging and compressing them. As has been illustrated earlier with reference to FIGS. 2 and 3, the outer tool 26 is provided with one or more ducts 40 for receiving extruded plastic material and is disposed to be movable in relation to the inner tool 24. The inner tool 24 has (as was described previously) the form of an arm 28 or a mandrel, which is placed on a mandrel wheel 46 with five mandrels. In other embodiments, there may be provided a different number of mandrels on the mandrel wheel 46. The mandrels 28 are placed so that they project out radially from the mandrel wheel 46. The mandrel wheel 46 is disposed to rotate intermittently on a shaft (not shown) in such a manner that the mandrels are positioned one at a time in the correct position in register with the outer tool 26.

In the example, the sleeve 12 of paper laminate is placed together with the cap 34 on a mandrel 28, in successive steps, a part of the mandrel then forming the inner tool 24. The inner tool 24 is then positioned in line with the outer tool 26. When they are converged together, the previously mentioned cavity is formed between them, and the duct(s) 40 of the outer tool discharges in the cavity.

It can be seen that the outer tool 26 is mounted on a movable frame with a lower plate 48 and an upper plate 50, the lower and upper plates 48, 50 being held together by means of a number of rods 52. The plates 48, 50 are disposed in spaced apart relationship from one another in order to make room for the parts of the injection moulding mechanism. The outer tool 26 is disposed on the lower plate 48. The frame, which is formed by the lower and the upper plate, 48, 50 and the rods 52, is disposed to be able to move on rails 54. These rails 54 are in turn fixedly tensioned in a base plate 56. Said base plate 56 is tensioned in at the mandrel wheel 46, at its centre.

In its other end, the rails 54 are fixedly disposed in a stand 58, the stand supporting a first servomotor 60 and a second servomotor 62. A first pivotal arm 64 is connected to the servomotor by means of a first pivot shaft 66 disposed eccentrically on a disk 68 in that it is positioned a distance from the axis of rotation of the disk. The disk 68 is rotated by means of the first servomotor 60. The first pivotal arm 64 is connected to a second pivotal arm 70 by means of a second pivot shaft 72. The second pivotal arm 70 is connected to the upper plate 50 of the frame for the outer tool 26, by means of a third pivot shaft 74.

A third pivotal arm 76 is connected in one end to the same pivot shaft 72 as the first and the second pivotal arms 64, 70. The other end of the third pivotal arm 76 is accommodated in the second servomotor 62.

In the starting position of the first servomotor 60, i.e. before rotation of the first servomotor, the second pivotal arm 70 slants in relation to an imaginary line 78. The imaginary line 78 runs through the centre of the cavity, intersects the pivotal shaft 74 between the second pivotal arm 70 and the upper plate 50 of the frame, intersects the shaft and eccentric element for the second servomotor 62 and runs through the centre of the mandrel wheel 46. When the first servomotor 60 has been rotated to its end position, in which the cavity is partly closed, see FIG. 5b, the second pivotal arm 70 has, because of the arrangement of the first, the second and the third pivotal arms 64, 70, 76 as well as the first, the second and the third pivot shafts 66, 72, 74, been moved to a position in line with the imaginary line 78. The third pivotal arm 76 is disposed in such a manner that it will also lie in line with the second pivotal arm 70 and the imaginary line 78, when the first servomotor 60 has reached its end position.

The second servomotor 62 is provided with an eccentric element, which is to act on the third pivotal arm 76. The eccentric element is formed on the rotary shaft of the second servomotor, and the third pivotal arm 76 is journalled in a roller bearing. Since the second servomotor 62 is only driven once the first servomotor 60 has reached its end position, the eccentric element of the second servomotor will act on a straight linkage mechanism.

Thus, the first servomotor 60 cooperates with an elbow joint mechanism in the form of the first, the second and the third pivotal arms 64, 70, 76 in order to partly close the cavity. The second servomotor 62 cooperates with an eccentric element and with the second and the third pivotal arms 70, 76, in order to close and lock the cavity with a high locking force, thereby compressing the plastic material inside the cavity.

An extruder 80 is placed at the mechanism for injection compression. A tube 82 is disposed to lead the plastic material from the extruder 80, via the duct/ducts 40 in the outer tool 26 and into the cavity which is formed between the outer and the inner tools 24, 26.

The example which is illustrated has the following working cycle. The mandrel wheel 46 has five mandrels 28 at uniform spaced apart relationship, each one forming an inner tool 24. The mandrel wheel 46 is rotated or indexed a fifth of a complete revolution during each working cycle. Each mandrel 28 will hereafter assume five different positions. In a first position, a sleeve 12 is placed on the mandrel 28. In a second position, a cap 34 is placed on the mandrel. In a third position, a plastic top 14 is injection moulded between the sleeve 12 and the cap 34. After that position, the sleeve 12, the plastic top 14 and the cap 34 will thus form a unit. In a fourth position of the mandrel 28, the thus formed unit is permitted to cool. In the fifth and last position, the formed unit is released from the mandrel 28.

At the introduction of a working cycle, a mandrel 28, i.e. the inner tool 24, is placed in line with the outer tool 26. The inner tool 24 carries a sleeve 12 and a cap 34. When the first servomotor 60 closes the cavity, in that the outer tool 26 is displaced downwards towards the inner tool 24, the cavity is formed. The movement of the first servomotor rotates the disk 68 which holds a pivot shaft 66 to which the first pivotal arm 64 is connected. As a result of the movement of the first pivotal arm, the second and the third movable arms 70, 76 will also move. The first servomotor 60 will move the second and the third arms 70, 76 to a position in which said arms will form a straight line in line with the imaginary line 78. In this position, the first servomotor 60 is arrested, which gives the end position of the first servomotor, see FIG. 5b. The previously mentioned second, partly closed, position from FIG. 2 has now been reached.

The next step of the working cycle is that the extruder 80 injects in plastic material in the cavity, via the tube 82 and the duct/ducts 40 of the outer tool. As has been described previously, the injected plastic material will not fill the cavity. Thereafter, the second servomotor 62 is rotated, whereby the eccentric element which is connected to the second servomotor 62 will act on the third pivotal arm 76 in such a manner that the outer tool 26 is moved further towards the inner tool 24 and closes the cavity, see FIG. 5c. The previously mentioned third, closed, position from FIG. 3 will now be reached. The second servomotor 62 is rotated about a third to half of a complete revolution. This relatively long movement of the second servomotor 62 is converted by means of the eccentric element into a movement of the outer tool 26 of only 1-2 mm. This additional movement of the outer tool 26 compresses together the injected plastic material in such a manner that the material fills out the cavity. When both of the servomotors 60, 62 are located in their end positions, the injected material is cooled. The cooling is thus effected under pressure and is normally carried out from the inside of the cavity.

After cooling, the cavity is opened in that the outer tool 26 is raised from the inner tool 24, by means of at least the first servomotor 60. Normally, the first and the second servomotors 60, 62 are moved simultaneously. When both of the servomotors 60, 62 are back at their starting positions, the mandrel wheel 46 is indexed a fifth of one complete revolution. A new working cycle may now be commenced.

By way of introduction, it was described that the outer tool 26 is at least partly freely suspended.

One example of that which is intended may be described in general terms that at least one of the moulding tools is suspended via a resilient element, and that the compression force can thereby be restricted somewhat depending upon the preconditions, i.e. depending upon, for example, the position of the moulding tools (and possible oblique guiding) and possible distortion of the distribution of the plastic melt inside the cavity. As resilient element, a number of machine elements can be used such as, for example, springs, rubber elements or the like.

In the mechanism which has been described with reference to FIGS. 5a-5c, the resilient elements are the above described rails 54. These rails 54 on which the frame with the outer moulding tool 26 runs, are relatively long and slim, of the order of magnitude of 100-120 centimeters long, and are disposed to be slightly stretchable. As was described previously, they are fixedly tensioned in the stand 58 and the base plate 56. On operation, the force on the rails 54 from the elbow joint mechanism is about 50 to 100 kN. The elbow joint mechanism acts between the frame with the outer moulding element 26 and the stand 58, and when the mechanism is extended so as to displace the outer moulding tool, the rails 54 will strive to be extended or stretched, which thereby creates the compression force. The long and slim rails 54 are disposed to be able to be stretched about 0.05 to 0.1 percent of their length, which for a 100 centimeters long rail means approximately 0.5 to 1 millimeter.

The outer tool 26 is somewhat movable in a transverse direction, in addition to the longitudinal direction which is given by the longitudinal extension of the rails 54. This mobility in the transverse direction, lateral displacement, is made possible by an outward flexing of the rails 54 and a small play between the rails 54 and above all the lower plate 48. The lateral displacement makes the outer tool 26 self-adjusting, since it will be adapted in response to the force balance in the cavity. On injection compression, where the plastic melt is injected in one or more points in a partly open cavity, the compression of the cavity will create a force balance which will strive to realise a more or less uniform material thickness of the finished plastic part, despite possible differences in the quantity of material injected into the different points in the cavity. This becomes possible if the outer tool 26 can move both in the longitudinal and in the transverse direction. The inner tool 24 may, on the other hand, be held more or less permanently fixed.

The maximum possible mobility in the transverse direction of the outer tool 26 should be of the order of magnitude of 0.5 to 1 millimeter (corresponding to 0.05 to 0.1 percent of the length of the previously described rails 54) when the mechanism is exposed to forces which normally occur in connection with injection compression.

Both the longitudinal and transverse mobility should be adapted to the specific application. In the above example, the mobility is about half of the distance which the second eccentric element gives, i.e. if the movement which the eccentric element executes in the longitudinal direction is approx. 1 millimeter, the mobility of the outer tool 26 in the longitudinal direction is about 0.5 millimeter.

In this context, it should be understood that an ideal situation of the free suspension is completely static suspension of one of the tools 24, 26. No example of such a solution is illustrated, but naturally such a solution is encompassed in the term "at least partly freely suspended".

This at least partial free suspension of the outer tool 26 entails that the compression force, or the resultant of this compression force, which compresses the tools 24, 26 may be described as acting in a force centre. This force centre is illustrated in the figures for the sake of simplicity as a force which is designated F. In the illustrated mechanism, the force centre F is shown in line with the imaginary line 78, i.e. the force centre F acts in the centre of the cavity. However, it should be understood that such need not be the case.

It has proved that a partially free suspension of one of the moulding tools 24, 26 and the relationship between the positioning of the injection points 42 and the positioning of the force centre F play a decisive role for how stability and self-adjustment can be attained in the moulding operation, and thereby how uniform the material thickness which can be achieved.

In the following disclosure, the relationship between the positioning of the injection points 42 and the position of the force centre F will be described with reference to FIGS. 6 to 12.

The plastic top which is to be manufactured may be two- or three dimensional. Normally, it is three dimensional and may, for example, have the appearance as shown in the earlier figures. Its form may be rotational symmetric with the neck centrally placed, but may also have a different, for example asymmetric configuration.

The outer tool 26 is designed so that the plastic melt is injected in one or more points 42 distributed over the surface of the cavity.

First, a case will be described with four injection points with the aid of the following theoretical model. FIG. 6 shows a body 88 which symbolises the cavity 30 for moulding a plastic top, in this case a rotation-symmetrical top with a neck of the type shown in, for example, FIG. 4a. The upper part of the FIG. 6 shows a perspective view of the body while the lower part shows a plan view of the body seen from above. On the body 88 are shown a number of crosses which designate points 42 where the plastic melt is injected. In the example there are four injection points 42 (said first number=4), of which only three are illustrated in the uppermost view for the sake of clarity. The injection points 42 lie on one and the same level and are uniformly distributed along the periphery of the body.

When the plastic melt is injected into the cavity, there is formed an island 45 of melt for each one of the injection points 42. In the example, the cavity is of similar appearance around the injection points and an equal amount of melt is injected in each point, for which reason four similar islands are formed. Projections of these islands on a plane P which is orthogonal to a direction D for the compression force with force centre F gives ovals 45', as is illustrated with the aid of the lower part of FIG. 6. Straight imaginary lines may be drawn between the projections in different ways to form a surface 92. The size of this surface depends at least on how many and which of the projections that are interconnected and how many straight lines that are employed for the interconnection. The surface size also depends on how these straight lines are drawn. As is clearly apparent from the figure, the surface is maximised in this case if all ovals 45' (said third number=4) are interconnected by four imaginary lines (said second number=4) which in a radial direction are drawn as far out as possible.

In this context, it should be observed that the imaginary surface 92 which is formed in the above described manner will always have the form of a plane, also in a case where the injection points do not lie on one and the same level in the cavity. This is naturally because it is not the islands of plastic melt but rather the projections of these islands that are employed for defining the surface 92.

It is now time to look at where said force centre F should act. In order to realise stability, it is important that the force centre F acts within the surface 92, i.e. passes through the surface 92 in some way. If the force centre F instead acts outside the surface 92, the cavity and the outer tool will not be capable of achieving the previously described force balance. The self-adjustment, which derives from the at least partly free suspension of the outer tool, cannot counteract the force from the plastic melt, and the outer moulding tool runs the risk of being obliquely off-set more or less permanently. This will have as a result that the material thickness of the top will be uneven. If instead the force centre F acts within the surface 92, the cavity and the outer moulding tool can achieve a force balance between the compression force and the force from the plastic melt. As a result, the plastic melt flows out substantially uniformly in the mould, and this takes place sufficiently rapidly for it not to have time to harden anywhere even though the material thickness of the plastic top is slight. In the example, the force centre F is shown in the centre of the region, i.e. in this case on the axis of symmetry of the body 88.

FIG. 7 corresponds to the lower part of FIG. 6 and schematically illustrates the case with one injection point 42 (said first number=1). When the plastic melt has been injected into the cavity, an island of plastic melt is formed therein. A projection of this island on a plane P gives an oval 45'. This arrangement will be stable if the force centre passes through a surface 92 in the form of the oval 45'.

FIG. 8 corresponds to the lower part of FIG. 6 and schematically illustrates the case with a top with a slightly different design and two injection points 42 (said first number=2). When the plastic melt has been injected into the cavity, an island of plastic melt is formed therein for each one of the injection points 42. The islands are of equal size. Projections of these islands on a plane P give ovals 45'. Two imaginary straight lines 90 (said second number=2) interconnect the two ovals 45' (said third number=2) in such a manner that a surface 92 which is thereby formed will be at its maximum. This arrangement will be stable if the force centre passes through the surface 92.

FIG. 9 corresponds to the lower part of FIG. 6 and schematically illustrates the case with a top with a design according to FIG. 8 and three injection points 42 (said first number=3). When the plastic melt has been injected into the cavity, an island of plastid melt is formed therein for each one of the injection points 42. The centremost island is smaller than the others. Projections of these islands on a plane P give two ovals 45' and a circle 45". Two imaginary straight lines 90 (said second number=2) interconnect the two ovals 45' (said third number=2) in such a manner that a surface 92 which is thereby formed will be at its maximum. This arrangement will be stable if the force centre passes through the surface 92.

FIG. 10 corresponds to the lower part of FIG. 6 and illustrates schematically the case with a top with a design according to FIGS. 8 and 9 and three injections points 42 (said first number=3). When the plastic melt has been injected into the cavity, an island of plastic melt is formed therein for each one of the injection points 42. The centremost island is larger than the others. Projections of these islands on a plane P give two ovals 45' and a circle 45". Four imaginary straight lines 90 (said second number=4) interconnect the two ovals 45' and the circle 45" (said third number=3) in such a manner that a surface 92 which is thereby formed will be at its maximum. This arrangement will be stable if the force centre passes through the surface 92.

In order to ensure stability and balance in the moulding of thin-walled plastic parts such as package tops, it thus holds that the apparatus is to be designed so that the plastic melt may be injected in a first number of points distributed over the cavity in such a manner that said force centre F may be caused to pass through a surface 92 which is defined by a parallel projection of each one of said first number of islands on a plane P which is orthogonal to a direction D for the compression force and, when said first number >1, a second number of imaginary straight lines 90 which interconnect a third number of parallel projections in such a manner that the surface 92 will be at its maximum. As is apparent from the foregoing examples, said first, second and third number may be the same or may differ from one another.

A model rather like that described with reference to FIG. 6 applies in that case where a plurality of plastic tops are moulded simultaneously. In that case, the outer and inner tools may together form a plurality of cavities, where each cavity has the form of a plastic top and is disposed to be able to receive an end portion of a sleeve. The suspension of the outer tool is just as previously of the at least partly free type, i.e. a certain mobility, self-adjustment, in relation to the inner tool is possible.

In order to achieve stability in two dimensions, the following applies. There should be at least one point to inject plastic melt in each respective cavity and in total a first number of injection points, one island of melt for each injection point being formed inside the cavities. Further, the distribution of said points should be such that said force centre may be caused to pass through a surface which is defined by a parallel projection of each one of said first number of islands on a plane which is orthogonal to a direction for the compression force and a second number of imaginary straight lines which interconnect a third number of the parallel projections in such a manner that the surface will be at its maximum.

This may be illustrated by a couple of very schematic examples.

In FIG. 11, a rectangle symbolises the outer tool 26. The two circles illustrate two cavities 30 for the formation of two tops of the type shown in earlier figures. The crosses show the injection points 42 for the plastic melt. In this case, there are two points per cavity (said first number=2×2=4). When the plastic melt has been injected into the cavities, an island of plastic melt is formed therein for each one of the injection points 42. Projections of these islands on a plane P give four ovals 45'. Four imaginary straight lines 90 (said second number=4) interconnect the four ovals 45' (said third number=4) in such a manner that a surface 92 which is thereby formed will be at its maximum. This arrangement will be stable if the force centre passes through the surface 92.

In FIG. 12, a square symbolises instead the outer tool 26. The circles show the cavities 30. They are four in number for moulding four tops of the type illustrated in earlier figures. The crosses symbolise as before the injection points 42. In this case there are three injection points 42 per cavity 30 (said first number=4×3=12). When the plastic melt has been injected into the cavities there is formed an island of plastic melt therein for each one of the injection points 42. Projections of these islands on a plane P give twelve ovals 45'. Eight imaginary straight lines 90 (said second number=8) interconnect eight of the ovals 45' (said third number=8) in such a manner that a surface 92 which is thereby formed will be at its maximum. This arrangement will be stable if the force centre passes through the surface 92.

A brief account of the method according to the present invention will be presented below.

In the manufacture of one package top per set of outer and inner mould elements, the method comprises, apart from providing said inner and outer mould elements 24, 26 with a mould cavity 30, ensuring that at least one of said mould elements 24, 26 is at least partly freely suspended. Said end portion 20 of the sleeve 12 is disposed so that it is in contact with the cavity 30. Further, a plastic melt 32 is injected into the cavity 30 and said mould elements 24, 26 are converged so that the cavity 30 is closed. Thereafter, a compression force is applied on the mould elements 24, 26 in order to force out the plastic melt 32 in the cavity 30, the compression force, as a result of the partly free suspension of at least one of the mould elements 24, 26, acting in a force centre F.

The method also includes the steps of injecting the plastic melt 32 in a first number of points 42 in the cavity 30, this first number being one or more, in order to form inside the cavity an island of plastic melt for each point, and ensuring that the distribution of said points 42 is such that said force centre F may be caused to pass through a surface 92 which is defined by a parallel projection of each one of said first number of islands on a plane which is orthogonal to a direction of the compression force and, when said first number >1, a second number of imaginary straight lines which interconnect a third number of parallel projections in such a manner that the surface 92 will be at its maximum.

The manufacture of two or more package tops per set of outer and inner mould elements takes place in a similar manner. This comprises the steps of ensuring that at least one of said mould elements 24, 26 is at least partly freely suspended, disposing the end portions 20 of the sleeves 12 so that they are in contact with the cavities 30, injecting a plastic melt 32 in the cavities 30, converging said mould elements 24, 26 so that the cavities 30 are closed, and applying a compression force on the mould elements 24, 26 so as to force out the plastic melt 32 in the cavities 30, the compression force, as a result of the partly free suspension of at least one of the mould elements 24, 26, acting in a force centre F. The method is characterised by the steps of injecting the plastic melt 32 in a first number of points 42 distributed over the cavities 30 so that, for each one of the cavities there is at least one point, so as to form inside the cavities an island of plastic melt for each point, and ensuring that the distribution of said points 42 is such that said force centre F may be caused to pass through a surface 92 which is defined by a parallel projection of each one of said first number of islands on a plane which is orthogonal to a direction of the compression force, and a second number of imaginary straight lines which interconnect a third number of the parallel projections in such a manner that the surface 92 will be at its maximum.

It should be obvious to the skilled reader that the present invention is not restricted to the above described embodiments, but that a plurality of variations and modifications are conceivable without departing from the scope of the appended Claims.

For example, an opening device 16 in the form of a screw cap has been described. However, it should be understood that a multiplicity of different opening devices are conceivable. For example, the present invention may be employed together with a fold opening.

The package part which has been described herein is in the form of a package top. However, it should be understood that the top may consist of another type of package part, for example a side panel, a flat top portion, a lid, a bottom or the like in a packaging container. If the package part is in the form of an at least partly flat top portion, the injection moulding cavity may be provided with a lid where a part of the lid, as a result of the injection moulding, is moulded fast in the package part and forms a hinge. When the lid is raised, a pouring opening is formed in the flat top portion. This embodiment shares major similarities with the previously described fold opening.

Further, a body has been described as being in the form of a sleeve of packaging laminate comprising a core layer of paper. The body may naturally be other than a sleeve, it may have any given configuration whatever as long as it includes an end portion on which a package part of thermoplastic may be injection moulded. Similarly, the packaging laminate may naturally have a different structure than that described. For example, the laminate may be constructed from one or more thermoplastic layers, i.e. without either paper or aluminium foil.

It should be understood that the number of injection points needed must also naturally be related to the quantity of plastic melt which is desired in the cavity, as well as the geometric appearance of the cavity. A geometrically complicated configuration may require more injection points than a simple geometric shape.

In the figures, a rotation-symmetric top has mostly been shown. However, it should be understood that the top need not be rotation-symmetrical. For example, it could be mirror-symmetrical or asymmetrical.

One example of the partly free suspension of the outer mould part has been described, but it should however be pointed out that the invention is not restricted thereto, but that many other solutions are naturally also conceivable. In this context, it might further be mentioned that the skilled reader of this specification will understand that the exact configuration and design of those parts which support the servomotors, the linkage system and the outer mould part may vary as long as they fulfil the intended function.

Injection compression has been described. However, the present invention is also well suited for compression moulding. The plastic melt is then introduced in spot form in said points in one of the mould elements. Thereafter, the two mould elements are urged against one another. The principle of the points and the application of the compression force are the same, and it is similarly an advantage if at least one of the mould elements is at least partly freely suspended.

In the example it is shown how a package top is formed or moulded against a cap in the form of a screw cap. However, the present invention is not restricted to moulding against a cap. The cap may be applied on a later occasion. In a number of cases where the top is not moulded against a cap, the pouring opening may instead be manufactured with a tear-off membrane. The top will then also be closed after the moulding operation.

What is claimed is:

1. An apparatus for moulding a thermoplastic package part in association with an end portion of a packaging container body, the packaging container body including thermoplastic at least in an inner layer, the apparatus comprising:
an inner mould element and an outer mould element between which a mould cavity is formed, the cavity being disposed to be able to receive at least said end portion of the packaging container body so that it is in contact with the cavity, and of which at least one of said mould elements is at least partly freely suspended,
means for injecting a plastic melt in the cavity,
means for converging said mould elements so that the cavity is closed and for applying a compression force on the mould elements for forcing out the plastic melt in the cavity, the compression force, as a result of the partly free suspension of at least one of the mould elements, acting in a force centre, wherein
the plastic melt is injected in a first number $\geq 1$ of points in the cavity, an island of plastic melt for each point being formed inside the cavity, and
a distribution of said points is such that said force centre may be caused to pass through a surface which is defined by a parallel projection of each one of said first number of islands on a plane which is orthogonal to a direction of the compression force, and, when said first number >1, a second number of imaginary straight lines which interconnect a third number of the parallel projections in such a manner that the surface will be at its maximum.

2. The apparatus as claimed in claim 1, further comprising:
means for converging the mould elements so that the cavity is partly closed before the plastic melt is injected; and
the plastic melt is injected in the cavity through ducts, each of which ducts is in its one end in communication with an extruder and in its other end discharges in the cavity in one of said points.

3. The apparatus as claimed in claim 1, wherein
a partial quantity of the plastic melt is injected into each of said points in a position where the cavity is substantially open.

4. The apparatus as claimed in claim 1, wherein
the package part is moulded on a packaging container body in the form of a sleeve of packaging laminate comprising a core layer of paper.

5. The apparatus as claimed claim 1, wherein
the cavity in its closed position has a form of a package top including a pouring opening.

6. The apparatus as claimed in claim 5, wherein
the cavity is disposed also to be able to receive an opening device in a form of a cap, the cap together with a part of the inner mould element, being disposed to form a neck of said package top which defines said pouring opening.

7. The apparatus as claimed in claim 1, wherein
the at least partly free suspension implies that at least one of the mould elements is suspended via a resilient element, and that the compression force may thereby be restricted somewhat.

8. The apparatus as claimed in claim 1, wherein
one of the mould elements which is at least partly freely suspended is substantially statically suspended.

9. An apparatus for moulding two or more thermoplastic package parts in association each with an end portion of a packaging container body, the packaging container body including thermoplastic at least in an inner layer, the apparatus comprising
an inner mould element and an outer mould element between which an injection mould cavity per package part is formed, the cavity being disposed to be able to receive at least said end portion of the packaging container body so that packaging container body is in contact with the cavity and of which at least one of said mould elements is at least partly freely suspended;
means for injecting a plastic melt in the cavities;
means for converging said mould elements so that the cavities are closed and for applying a compression force on the mould elements in order to force out the plastic melt in the cavities, the compression force, as a result of the partly free suspension of at least one of the mould elements, acting in a force centre, wherein
the plastic melt is injected in a first number of points distributed over the cavities so that, for each one of the cavities, there is at least one point, an island of plastic melt for each point being formed inside the cavities; and
a distribution of said points is such that said force centre may be caused to pass through a surface which is defined by a parallel projection of each one of said first number of islands on a plane which is orthogonal to a direction of the compression force, and a second number of imaginary straight lines which interconnect a third number of the parallel projections in such a manner that the surface will be at its maximum.

10. A method for moulding a thermoplastic package part in association with an end portion of a packaging container body, the packaging container body including thermoplastic at least in an inner layer, the method comprising
providing an inner mould element and an outer mould element between which a mould cavity is formed;
ensuring that at least one of said mould elements is at least partly freely suspended;
disposing said end portion of the packaging container body so that the end portion is in contact with the cavity;
injecting a plastic melt in the cavity;
converging said mould elements so that the cavity is closed;
applying a compression force on the mould elements in order to force out the plastic melt in the cavity, the compression force, as a result of the partly free suspension of at least one of the mould elements, acting in a force centre,
the method being comprised of:
injecting the plastic melt in a first number $\geq 1$ of points in the cavity in order to form inside the cavity an island of plastic melt for each point, and
ensuring that the distribution of said points is such that said force centre may be caused to pass through a surface which is defined by a parallel projection of each one of said first number of islands on a plane which is orthogonal to a direction of the compression force and, when said first number >1, a second number of imaginary straight lines which interconnect a third number of the parallel projections in such a manner that the surface will be at its maximum.

11. A method for moulding two or more thermoplastic package parts in association each with an end portion of a packaging container body, the packaging container body including thermoplastic at least in an inner layer, the method comprising
providing an inner mould element and an outer mould element between which a mould cavity per package part is formed;
ensuring that at least one of said mould elements is at least partly freely suspended;

disposing said end portion of the packaging container body so that it is in contact with the cavity;
injecting a plastic melt in the cavities;
converging said mould elements so that the cavities are closed;
applying a compression force on the mould elements in order to force out the plastic melt in the cavities, the compression force, as a result of the partly free suspension of at least one of the mould elements, acting in a force centre;
injecting the plastic melt in a first number of points distributed over the cavities so that for each one of the cavities there is at least one point, so as to form inside the cavities an island of plastic melt for each point; and
ensuring that the distribution of said points is such that said force centre may be caused to pass through a surface which is defined by a parallel projection of each one of said first number of islands on a plane which is orthogonal to a direction of the compression force, and a second number of imaginary straight lines which interconnect a third number of the parallel projections in such a manner that the surface will be at its maximum.

* * * * *